US011938904B2

(12) United States Patent
Bernal et al.

(10) Patent No.: US 11,938,904 B2
(45) Date of Patent: Mar. 26, 2024

(54) ADJUSTABLE BED DIVIDER SYSTEM FOR A PICKUP TRUCK

(71) Applicant: GM Global Technology Operations LLC, Detroit, MI (US)

(72) Inventors: Jesus Anthony Bernal, Farmington Hills, MI (US); Eric James Bontrager, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/747,264

(22) Filed: May 18, 2022

(65) Prior Publication Data

US 2023/0373402 A1  Nov. 23, 2023

(51) Int. Cl.
*B60R 9/06* (2006.01)

(52) U.S. Cl.
CPC ..................... *B60R 9/06* (2013.01)

(58) Field of Classification Search
CPC ....................................... B60R 9/06
USPC ........................................ 224/403
See application file for complete search history.

(56) References Cited

U.S. PATENT DOCUMENTS

| D300,734 | S | * | 4/1989 | Kruitbosch | D12/414 |
| 4,887,947 | A | * | 12/1989 | Bott | B60P 7/14 410/144 |
| 5,340,183 | A | * | 8/1994 | Horian | B60R 7/02 224/403 |
| 5,368,210 | A | * | 11/1994 | Wotring | B60P 7/08 224/558 |
| 5,520,314 | A | * | 5/1996 | Tkachuk | B60P 7/06 224/403 |
| 5,628,442 | A | * | 5/1997 | Wayne | B60R 7/005 224/543 |
| 5,697,742 | A | * | 12/1997 | House | B60P 7/15 410/127 |
| 5,975,819 | A | * | 11/1999 | Cola | B60P 7/14 410/121 |
| 6,524,043 | B2 | * | 2/2003 | Earle | B60P 7/14 410/94 |
| 6,543,975 | B2 | * | 4/2003 | Kopperud | B60P 7/14 410/151 |
| 6,676,182 | B2 | * | 1/2004 | Fitts | B60P 3/40 224/403 |
| 6,688,821 | B1 | * | 2/2004 | Snyder | B60P 7/14 410/151 |
| 6,692,204 | B1 | * | 2/2004 | Ricard | B60P 7/0892 410/121 |
| 6,971,828 | B2 | * | 12/2005 | Bernardo | B61D 45/006 410/139 |

(Continued)

*Primary Examiner* — Peter N Helvey
(74) *Attorney, Agent, or Firm* — CANTOR COLBURN LLP (57) ABSTRACT

A cargo bed divider system for a pickup truck includes a first guide rail connectable to a first lateral side of a cargo bed, a second guide rail connectable to a second lateral side of the cargo bed, a cargo bed divider supported between the first guide rail and the second guide rail, and an adjustment mechanism connectable to a forward end of the cargo bed and the cargo bed divider. The adjustment mechanism selectively moves the cargo bed divider between a first position adjacent the forward end of the cargo bed and a second position adjacent to a rear end of the cargo bed.

16 Claims, 5 Drawing Sheets

(56) References Cited

U.S. PATENT DOCUMENTS

| | | | |
|---|---|---|---|
| 6,974,170 B2 * | 12/2005 | Mulvihill | B60P 7/14 224/42.33 |
| 7,195,432 B2 * | 3/2007 | Earle | B60P 7/14 410/121 |
| 7,214,018 B2 * | 5/2007 | Lussier | B60P 7/14 410/130 |
| 7,273,336 B2 * | 9/2007 | Silamianos | B60P 7/14 410/129 |
| 7,413,231 B1 * | 8/2008 | Wood | B62D 33/0207 296/26.11 |
| 8,100,615 B1 * | 1/2012 | Freeborn | B60P 7/14 410/140 |
| 8,192,118 B2 * | 6/2012 | Zahorec | B60R 7/005 410/118 |
| 8,348,331 B2 * | 1/2013 | Holt | B62D 33/0273 296/183.1 |
| 8,998,547 B2 * | 4/2015 | Ferriggi, Jr. | B60R 9/06 410/97 |
| 9,016,764 B2 * | 4/2015 | Johnson | B62D 33/0273 296/183.1 |
| 9,132,767 B2 * | 9/2015 | Ferriggi, Jr. | B60P 7/14 |
| 10,252,680 B2 * | 4/2019 | Presley | B60P 7/135 |
| 10,427,615 B2 * | 10/2019 | Traxler | B62D 33/023 |
| 11,040,667 B2 * | 6/2021 | Chen | B60R 9/045 |
| 11,459,038 B2 * | 10/2022 | Schuling | B60P 7/0815 |
| 11,603,030 B2 * | 3/2023 | Buckley | B60P 7/135 |
| 11,618,508 B2 * | 4/2023 | Dexter | B62D 33/0207 224/404 |
| 2008/0101885 A1 * | 5/2008 | Kmita | B60P 7/14 410/130 |
| 2014/0027483 A1 * | 1/2014 | Bonner | B60P 7/14 224/403 |
| 2021/0155166 A1 * | 5/2021 | Singer | B60R 9/05 |
| 2022/0379815 A1 * | 12/2022 | Sutton | B60R 9/06 |
| 2023/0173990 A1 * | 6/2023 | Ni | B60J 7/1607 224/403 |

\* cited by examiner

ADJUSTABLE BED DIVIDER SYSTEM FOR A PICKUP TRUCK

INTRODUCTION

The subject disclosure relates to the art of vehicles and, more particularly to an adjustable bed divider system for a pickup truck.

Pickup trucks include beds that may be used to house and transport cargo. Cargo may come in various shapes and sizes some of which may take up an entire cargo bed and others which may take only a small portion of the cargo bed. In some cases, the cargo bed may include a fixed divider that may create a smaller cargo zone. However, cargo, particularly small cargo, may be difficult to access from a cargo bed even from the smaller cargo zone. Some small cargo is easy to restrain with straps. However other small cargo, particularly cargo that is more amorphous can be difficult to restrain and subsequently access. Accordingly, it is desirable to provide a system that enhances cargo storage and access for a pickup truck.

SUMMARY

In accordance with a non-limiting example, a cargo bed divider system for a pickup truck includes a first guide rail connectable to a first lateral side of a cargo bed, a second guide rail connectable to a second lateral side of the cargo bed, a cargo bed divider supported between the first guide rail and the second guide rail, and an adjustment mechanism connectable to a forward end of the cargo bed and the cargo bed divider. The adjustment mechanism selectively moves the cargo bed divider between a first position adjacent the forward end of the cargo bed and a second position adjacent to a rear end of the cargo bed.

In addition to one or more of the features described herein the cargo bed divider includes a first side, a second side that is opposite the first side, an upper edge, and a lower edge, the first side being supported by the first guide rail and the second side being supported by the second guide rail.

In addition to one or more of the features described herein the adjustment mechanism includes a first member pivotally connected to a second member, the first member including a first end connectable to the forward end of the cargo bed and a second end connected to the cargo bed divider adjacent the first side and the second member including a first end portion connectable to the forward end of the cargo bed and a second end portion connected to the cargo bed divider adjacent the second end.

In addition to one or more of the features described herein the first end and the second end are selectively moveable relative to one another to shift the cargo bed divider along the first guide rail and the second guide rail.

In addition to one or more of the features described herein the first end of the first member and the first end portion of the second member move relative to one another along a first axis and the cargo bed divider selectively moves along a second axis that is substantially perpendicular to the first axis.

In addition to one or more of the features described herein a first actuator is connected to the first member and a second actuator is connected to the second member, the first actuator and the second actuator selectively moving the first end and the first end portion relative to one another along the first axis.

In addition to one or more of the features described herein the cargo bed divider includes a first notch extending upwardly from the lower edge along the first side and a second notch extending upwardly from the lower edge along the second side, the first notch being configured to accommodate a first wheel well and the second notch being configured to accommodate a second wheel well.

In addition to one or more of the features described herein a first door selectively covers the first notch and a second door selectively covering the second notch.

In addition to one or more of the features described herein a first door actuator is mounted to the first door and a second door actuator mounted to the second door, the first door actuator selectively shifting the first door to expose the first notch and the second door actuator selectively shifting the second door to expose the second notch.

In addition to one or more of the features described herein the cargo bed divider includes a brush arranged along the lower edge.

In accordance with another non-limiting example, a vehicle includes a body including a passenger compartment and a cargo bed having a forward end, a rear end, a first lateral side and a second lateral side, and a cargo bed divider system arranged in the cargo bed. The cargo bed divider system includes a first guide rail connected to the first lateral side of the cargo bed, a second guide rail connected to the second lateral side of the cargo bed, a cargo bed divider supported between the first guide rail and the second guide rail, and an adjustment mechanism connected to the forward end of the cargo bed and the cargo bed divider. The adjustment mechanism selectively moves the cargo bed divider between a first position adjacent the forward end of the cargo bed and a second position adjacent to the rear end of the cargo bed.

In addition to one or more of the features described herein the cargo bed divider includes a first side, a second side that is opposite the first side, an upper edge, and a lower edge, the first side being supported by the first guide rail and the second side being supported by the second guide rail.

In addition to one or more of the features described herein the adjustment mechanism includes a first member pivotally connected to a second member, the first member including a first end connected to the forward end of the cargo bed and a second end connected to the cargo bed divider adjacent the first side and the second member including a first end portion connected to the forward end of the cargo bed and a second end portion connected to the cargo bed divider adjacent the second end.

In addition to one or more of the features described herein the first end and the second end are selectively moveable relative to one another to shift the cargo bed divider along the first guide rail and the second guide rail.

In addition to one or more of the features described herein the first end of the first member and the first end portion of the second member move relative to one another along a first axis and the cargo bed divider selectively moves along a second axis that is substantially perpendicular to the first axis.

In addition to one or more of the features described herein a first actuator is connected to the first member and a second actuator connected to the second member, the first actuator and the second actuator selectively moving the first end and the first end portion relative to one another along the first axis.

In addition to one or more of the features described herein the cargo bed divider includes a first notch extending upwardly from the lower edge along the first side and a second notch extending upwardly from the lower edge along the second side, the first notch being configured to accommodate a first wheel well projecting upwardly from the cargo bed and the second notch being configured to accommodate a second wheel well projecting upwardly from the cargo bed.

In addition to one or more of the features described herein a first door selectively covers the first notch and a second door selectively covering the second notch.

In addition to one or more of the features described herein a first door actuator mounted to the first door and a second door actuator mounted to the second door, the first door actuator selectively shifting the first door to expose the first notch and the second door actuator selectively shifting the second door to expose the second notch.

In addition to one or more of the features described herein the cargo bed divider includes a brush arranged along the lower edge.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
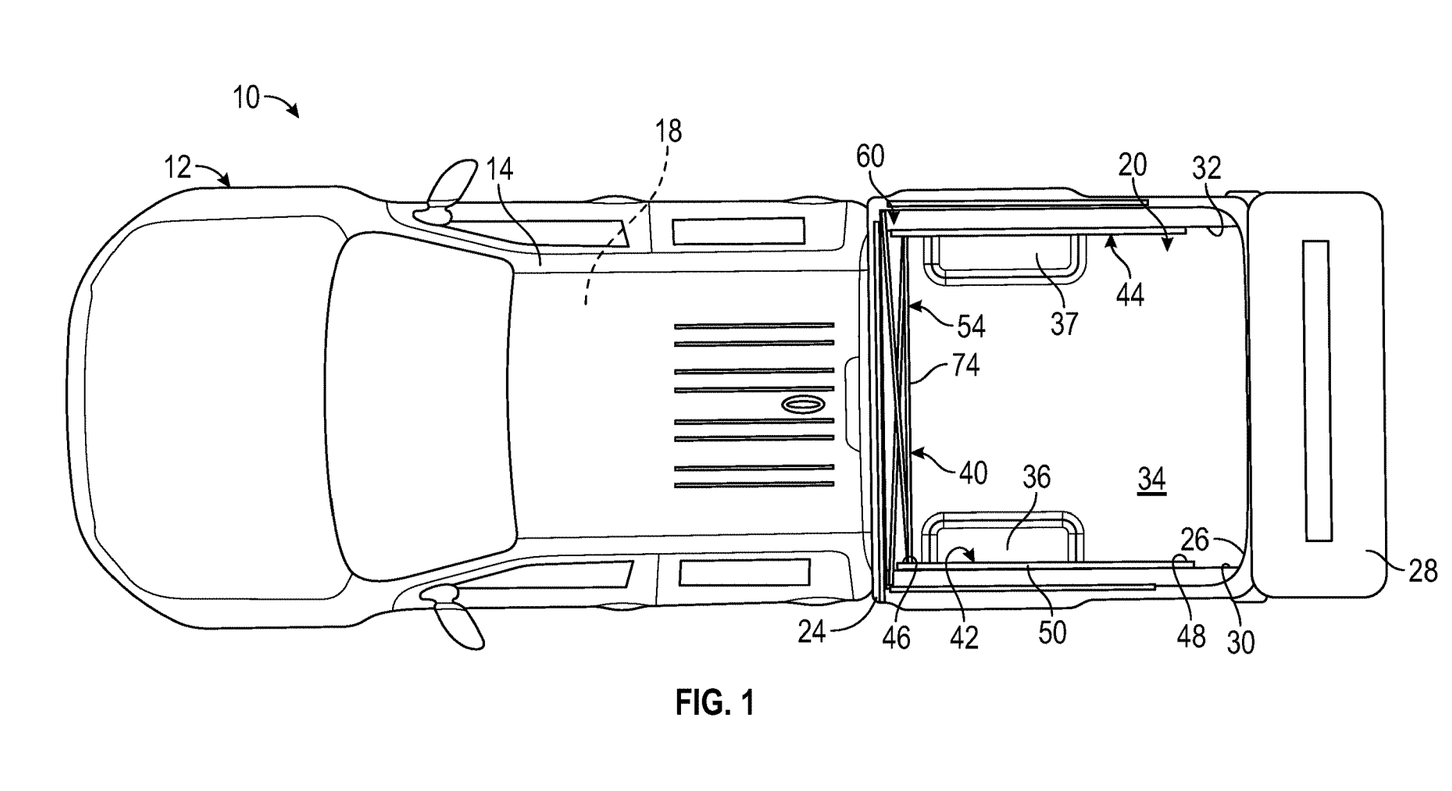
FIG. 1 is a top view of a vehicle having a cargo bed fitted with an adjustable cargo bed divider system showing a cargo bed divider in a first position, in accordance with a non-limiting example.

A vehicle, in accordance with a non-limiting example, is indicated generally at 10 in FIG. 1. Vehicle 10 takes the form of a pickup truck 12 having a body 14. Pickup truck 12 includes a passenger compartment 18 and a box or cargo area 20 arranged aft of passenger compartment 18. Cargo area 20 includes a forward end 24 (FIG. 2), a rear end 26 defined, in part, by a tailgate 28, a first lateral side 30 and a second lateral side 32. First lateral side 30 and second lateral side 32 extend between forward end 24 and rear end 26. A cargo bed 34 is arranged in cargo area 20 and is surrounded by forward end 24, rear end 26, first lateral side 30, and second lateral side 32. Cargo area 20 includes a first wheel well 36 projecting upwardly from cargo bed 34 at first lateral side 30 and a second wheel well 37 projecting upwardly from cargo bed 34 at second lateral side 32.

Figure 2:
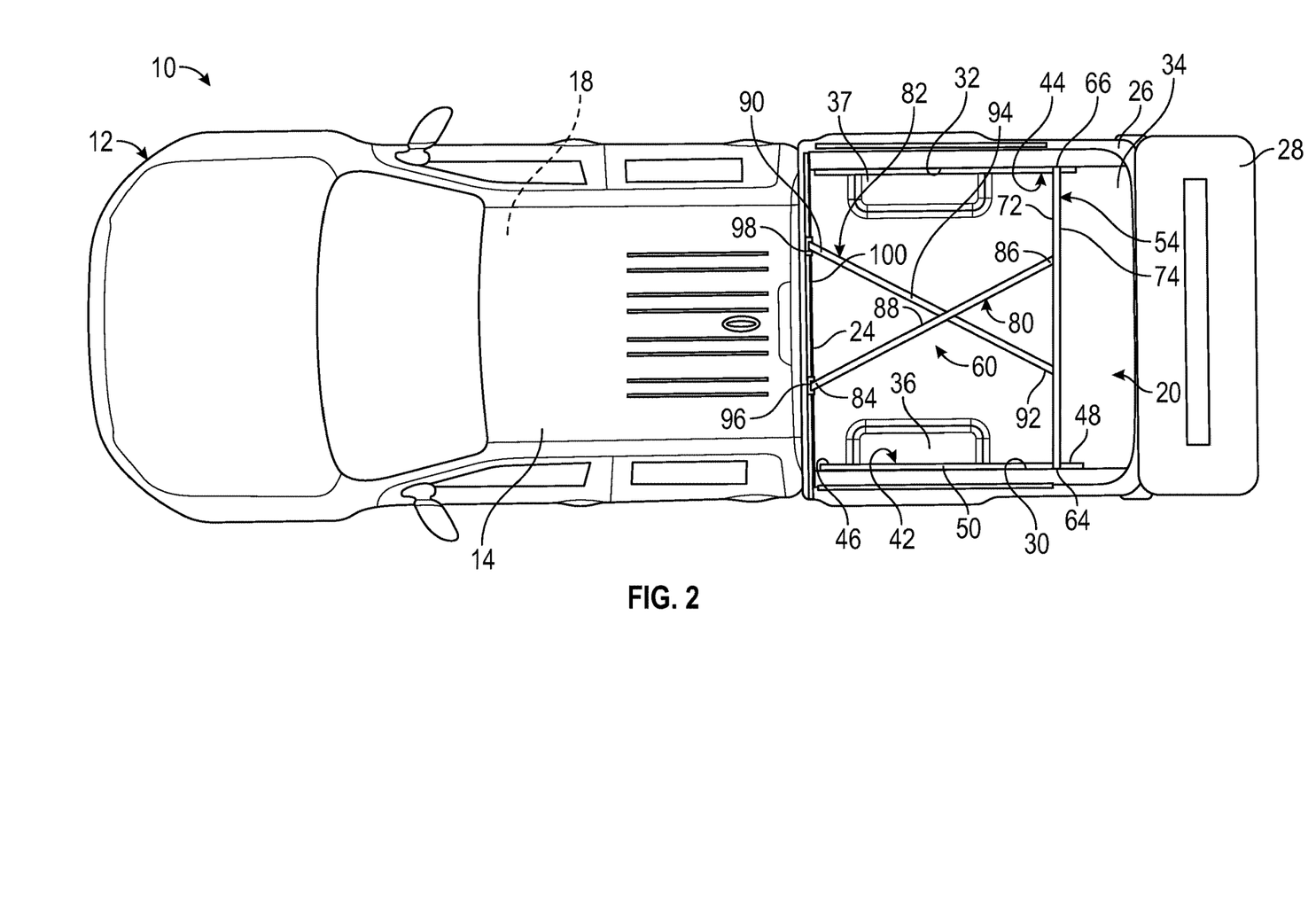
FIG. 2 is a top view of a vehicle having a cargo bed fitted with an adjustable cargo bed divider system showing a cargo bed divider in a second position, in accordance with a non-limiting example.

In a non-limiting example, pickup truck 12 includes an adjustable cargo bed divider system 40 that shifts between forward end 24 and rear end 26 in cargo area 20 to establish a storage zone having a user selected size. Cargo bed divider system 40 includes a first guide rail 42 mounted to first lateral side 30 of cargo area 20 and a second guide rail 44 mounted to second lateral side 32 of cargo area 20. First guide rail 42 includes a first end section 46 arranged proximate to forward end 24, a second end section 48 arranged proximate to rear end 26, and an intermediate section 50 extending between first end section 46 and second end section 48. Second guide rail 44 is similarly formed and arranged.

In a non-limiting example, cargo bed divider system 40 includes a cargo bed divider 54 arranged in cargo area 20. Cargo bed divider 54 extends between first lateral side 30 and second lateral side 32. As will be detailed herein, cargo bed divider 54 is coupled to an adjustment system 60. Adjustment system 60 may selectively position cargo bed divider 54 between forward end 24 and rear end 26. In a non-limiting example, cargo bed divider 54 includes a first side 64, a second side 66, an upper edge 68 (FIG. 4), and a lower edge 70 (FIG. 4) that is positioned adjacent to cargo bed 34. Cargo bed divider 54 also includes a forwardly facing surface 72 that faces towards forward end 24 and a rearwardly facing surface 74 that faces towards rear end 26.

Adjustment system 60 includes a first member 80 and a second member 82 that extend between forward end 24 and forwardly facing surface 72 forming a scissors mechanism (not separately labeled). It should be understood that the particular attachment points may vary. It should also be understood that, in addition to varying the location, the particular mechanism may vary. Adjustment system 60 could be incorporated into first and second lateral sides 30 and 32 or cargo bed 34. In a non-limiting example, first member 80 includes a first end 84 arranged at forward end 24, a second end 86 connected to forwardly facing surface 72, and an intermediate section 88 that extends between first end 84 and second end 86. Second member 82 includes a first end portion 90, arranged at forward end 24, a second end portion 92 connected to forwardly facing surface 72, and an intermediate portion 94 that extends between first end portion 90 and second end portion 92.

First end 84 is connected to a first linear actuator 96 and first end portion 90 is connected to a second linear actuator 98. First linear actuator 96 and second linear actuator 98 move along a track 100 to adjust a relative position of first end 84 and first end portion 90. More specifically, moving first end 84 and first end portion 90 towards one another causes cargo bed divider to move in a direction away from forward end 24 toward rear end 26. Likewise, moving first end 84 and first end portion 90 away from one another causes cargo bed divider to move in a direction away from rear end 26 toward forward end 24.

Figure 6:
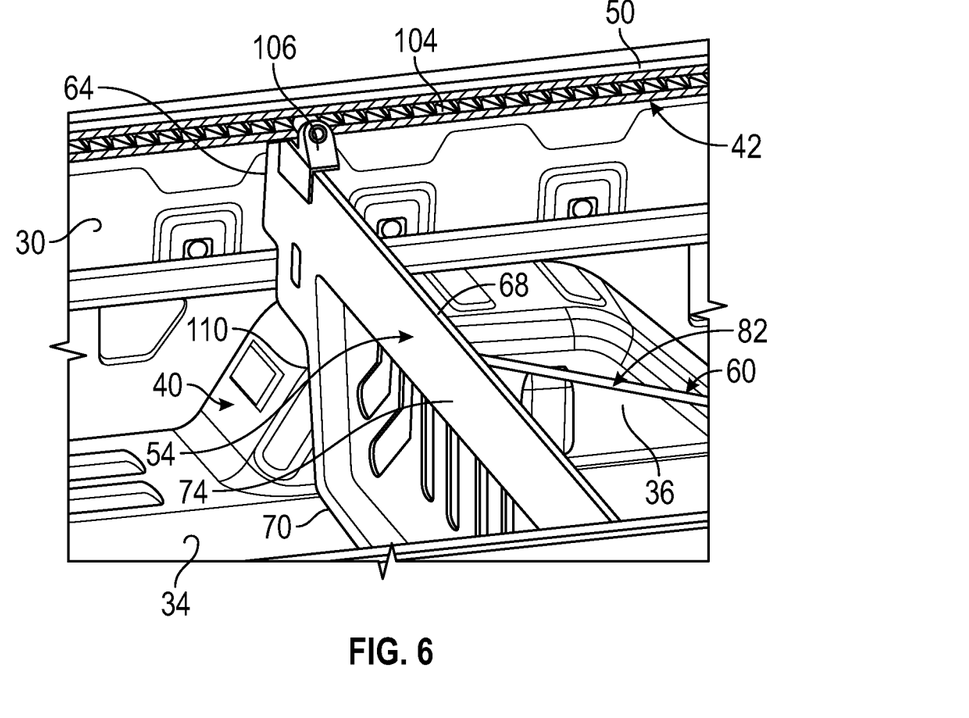
FIG. 6 is a partial perspective view of a guide rail of the cargo bed divider system, in accordance with a non-limiting example.

Cargo bed divider system 40 may include one or more ratchet elements 104 that extend along first guide rail 42 as shown in FIG. 6. Additional ratchet elements (not shown) may extend along second guide rail 44. Ratchet elements 104 cooperate with first pawls 106 on first side 64 and second pawls on second side 66 (shown schematically at 108 in FIG. 8) so as to lock cargo bed divider 54 in a selected position relative to forward end 24 and rear end 26. In a non-limiting embodiment, the pawls may be selectively released to allow additional movement.

Figure 3:
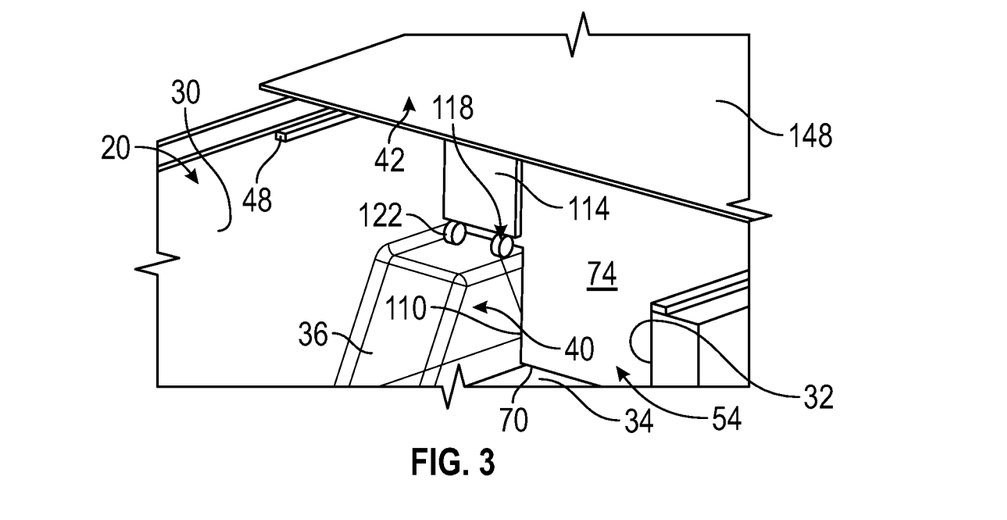
FIG. 3 is a partial perspective view of the cargo bed divider transitioning over a wheel well, in accordance with a non-limiting example.
Figure 4:
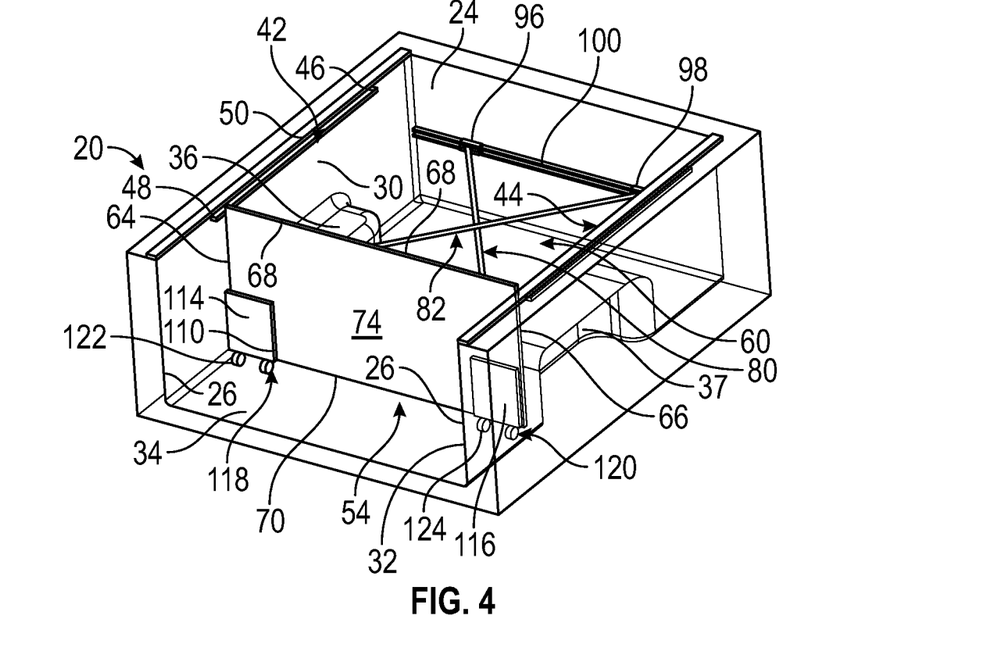
FIG. 4 is a partial perspective view of the cargo bed divider after having transitioned over a wheel well, in accordance with a non-limiting example.
Figure 5:
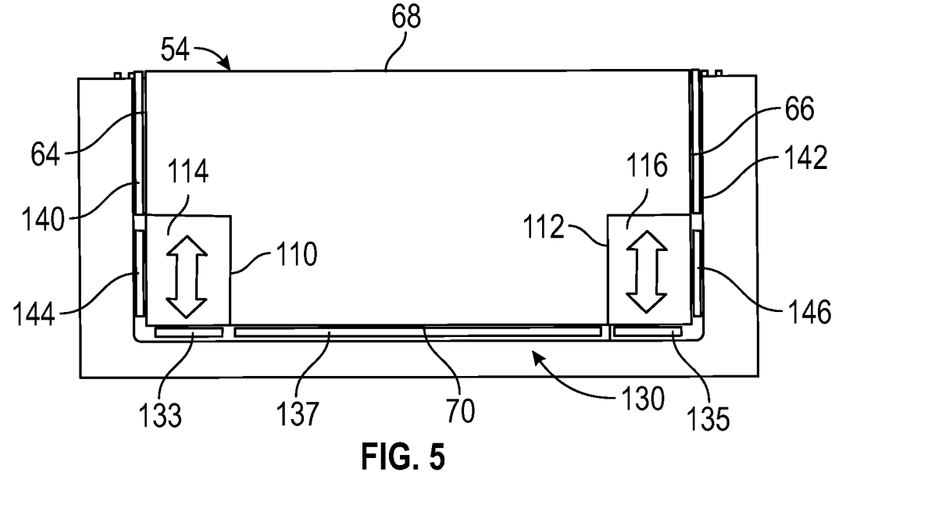
FIG. 5 is a plan view of the cargo bed divider including a brush member, in accordance with a non-limiting example.

Cargo bed divider 54 includes a first notch 110 and a second notch 112 that may accommodate first wheel well 36 and second wheel well 37 respectively as cargo bed divider 54 transitions between forward end 24 and rear end 26 as shown in FIGS. 3-5. First notch 110 extends from lower edge 70 toward upper edge 68 along first side 64. Second notch 112 extends from lower edge 70 toward upper edge 68 along second side 66. A first door 114 is selectively positionable across first notch 110. A second door 116 is selectively positionable over second notch 112. First door 114 includes a first door actuator 118 and second door 116 includes a second door actuator 120. First door actuator 118 may take the form of one or more first rollers 122 and second door actuator 120 may take the form of one or more second rollers 124.

In a non-limiting example, as cargo bed divider 54 transitions between forward end 24 and rear end 26 and back again, first rollers 122 engage first wheel well 36 and second rollers 124 engage second wheel well 37. First rollers 122 and second rollers 124 travel up angled surfaces (not separately labeled) on each of first wheel well 36 and second wheel well 37 (FIG. 3) causing first door 114 and second door 116 to selectively expose first notch 110 and second notch 112 respectively. In this manner, cargo bed divider 54 is provided an unobstructed movement path between forward end 24 and rear end 26 without the need for fixed openings in first side 64 and second side 66 to accommodate first wheel well 36 and second wheel well 37. The lack of fixed openings allows a user to transport cargo such as mulch, dirt and the like aft of cargo bed divider 54 while preventing the cargo from passing into a forward portion of cargo area 20.

Figure 7:
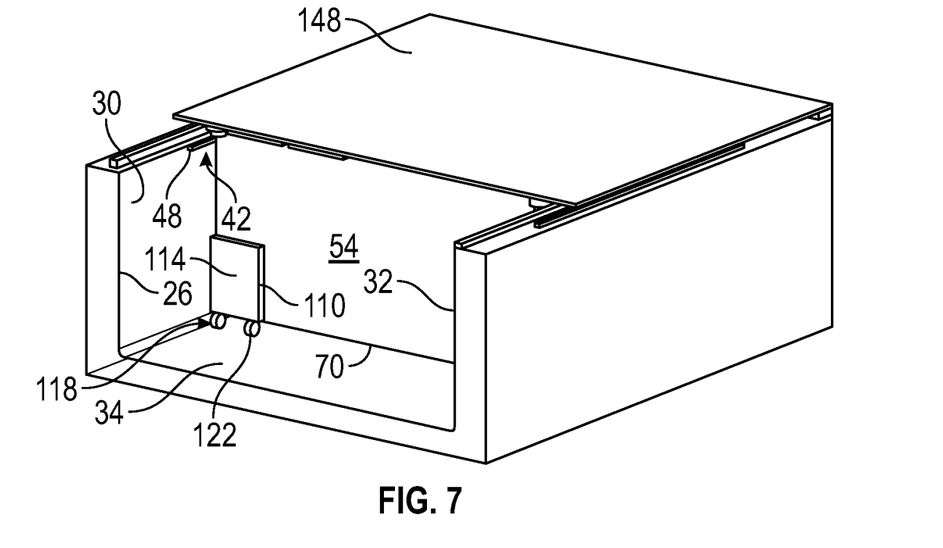
FIG. 7 is a partial perspective view of the cargo bed including a bed cover, in accordance with a non-limiting example.

In a non-limiting example illustrated in FIG. 5, cargo bed divider 54 includes a brush 130 arranged along lower edge 70. In a non-limiting example, brush 130 include a first brush portion 133 disposed on first door 114, a second brush portion 135 disposed on second door 116, and a third brush portion 137 disposed on lower edge 70 between first notch 110 and second notch 112. Brush 130 sweeps over cargo bed 34 as cargo bed divider 54 transitions between forward end 24 and rear end 26. In a non-limiting example, brush 130 allows a user to move loose cargo, such as mulch, toward rear end 26 with cargo bed divider 54. Further, cargo bed divider 54 may include additional brushes 140 on first side 64 and 142 on second side 66 and brushes 144 and 146 on side portions (not separately labeled) of first door 114 and second door 116. Further, cargo area 20 may include a cover 148 that extends over cargo bed 34 as shown in FIGS. 3 and 7.

Figure 8:
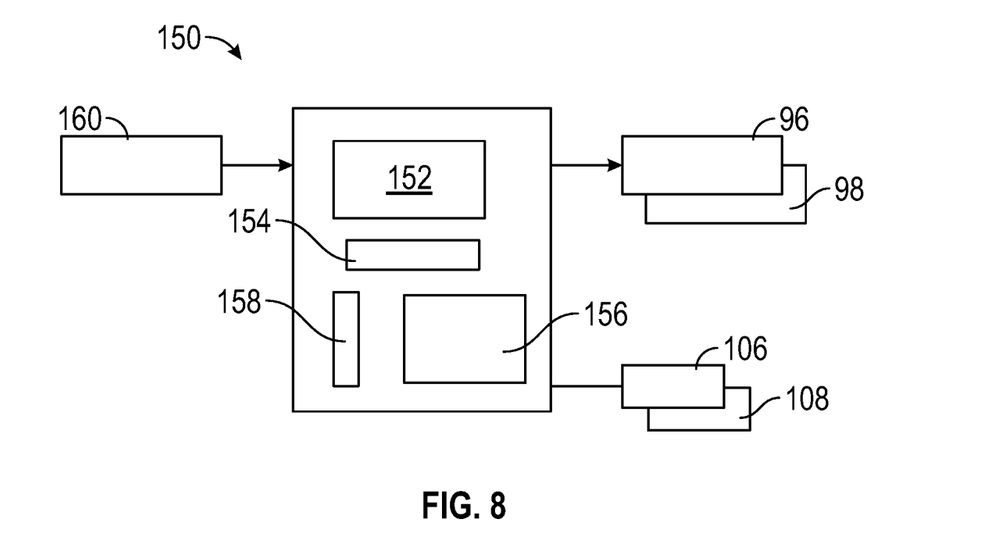
FIG. 8 is a block diagram illustrating a control actuation system for the cargo bed divider system, in accordance with a non-limiting example.

In a non-limiting example shown in FIG. 8, vehicle 10 may include a controller 150 that is employed to operate first and second actuators 96 and 98 in order to move cargo bed divider 54 between forward end 24 and rear end 26. Controller 150 includes a central processor unit (CPU) 152 operatively connected to a non-volatile memory 154. Controller 150 may also include an actuator module 156, and a lock module 158. Non-volatile memory 154 may contain a set of instructions for actuator module 156 for operating first actuator 96 and second actuator 98 as well as one or more saved positions for cargo bed divider 54. Lock module 158 may selectively release first pawl 106 and second pawl 108 to release cargo bed divider 54 based on instructions passed from actuator module 156.

An actuator 160 may be connected to controller 150. Actuator 160 may take on a variety of forms and be located in a variety of locations. For example, actuator 160 may take the form of a soft switch that forms part of an infotainment system (not shown) in passenger compartment 18, a solid state switch in passenger compartment 18 and/or cargo area 20, or the like. At this point, it should be understood that while described as being moved electronically, cargo bed divider 54 may alternatively be equipped with a manual system for position adjustment.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A cargo bed divider system for a pickup truck comprising:
   a first guide rail connectable to a first lateral side of a cargo bed;
   a second guide rail connectable to a second lateral side of the cargo bed;
   a cargo bed divider supported between the first guide rail and the second guide rail, the cargo bed divider including a first side, a second side that is opposite the first side, an upper edge, and a lower edge, the first side being supported by the first guide rail and the second side being supported by the second guide rail; and
   an adjustment mechanism connectable to a forward end of the cargo bed and the cargo bed divider, the adjustment mechanism selectively moving the cargo bed divider between a first position adjacent the forward end of the cargo bed and a second position adjacent to a rear end of the cargo bed, wherein the adjustment mechanism includes a first member pivotally connected to a second member, the first member including a first end connectable to the forward end of the cargo bed and a second end connected to the cargo bed divider adjacent the first side and the second member including a first end portion connectable to the forward end of the cargo bed and a second end portion connected to the cargo bed divider adjacent the second end.

2. The cargo bed divider system according to claim 1, wherein the first end and the second end are selectively moveable relative to one another to shift the cargo bed divider along the first guide rail and the second guide rail.

3. The cargo bed divider system according to claim 2, wherein the first end of the first member and the first end portion of the second member move relative to one another along a first axis and the cargo bed divider selectively moves along a second axis that is substantially perpendicular to the first axis.

4. The cargo bed divider system according to claim 3, further comprising a first actuator connected to the first member and a second actuator connected to the second member, the first actuator and the second actuator selectively moving the first end and the first end portion relative to one another along the first axis.

5. The cargo bed divider system according to claim 1, wherein the cargo bed divider includes a first notch extending upwardly from the lower edge along the first side and a second notch extending upwardly from the lower edge along the second side, the first notch being configured to accommodate a first wheel well and the second notch being configured to accommodate a second wheel well.

6. The cargo bed divider system according to claim 5, further comprising a first door selectively covering the first notch and a second door selectively covering the second notch.

7. The cargo bed divider system according to claim 6, further comprising a first door actuator mounted to the first door and a second door actuator mounted to the second door, the first door actuator selectively shifting the first door to expose the first notch and the second door actuator selectively shifting the second door to expose the second notch.

8. The cargo bed divider according to claim 1, wherein the cargo bed divider includes a brush arranged along the lower edge.

9. A vehicle comprising:
   a body including a passenger compartment and a cargo bed having a forward end, a rear end, a first lateral side and a second lateral side; and
   a cargo bed divider system arranged in the cargo bed, the cargo bed divider system comprising:
      a first guide rail connected to the first lateral side of the cargo bed;
      a second guide rail connected to the second lateral side of the cargo bed;
      a cargo bed divider supported between the first guide rail and the second guide rail, the cargo bed divider including a first side, a second side that is opposite the first side, an upper edge, and a lower edge, the first side being supported by the first guide rail and the second side being supported by the second guide rail; and
      an adjustment mechanism connectable to a forward end of the cargo bed and the cargo bed divider, the adjustment mechanism selectively moving the cargo bed divider between a first position adjacent the forward end of the cargo bed and a second position adjacent to a rear end of the cargo bed, wherein the adjustment mechanism includes a first member pivotally connected to a second member, the first member including a first end connectable to the forward end of the cargo bed and a second end connected to the cargo bed divider adjacent the first side and the second member including a first end portion connectable to the forward end of the cargo bed and a second end portion connected to the cargo bed divider adjacent the second end.

10. The vehicle according to claim 9, wherein the first end and the second end are selectively moveable relative to one another to shift the cargo bed divider along the first guide rail and the second guide rail.

11. The vehicle according to claim 10, wherein the first end of the first member and the first end portion of the second member move relative to one another along a first axis and the cargo bed divider selectively moves along a second axis that is substantially perpendicular to the first axis.

12. The vehicle according to claim 11, further comprising a first actuator connected to the first member and a second actuator connected to the second member, the first actuator and the second actuator selectively moving the first end and the first end portion relative to one another along the first axis.

13. The vehicle according to claim 9, wherein the cargo bed divider includes a first notch extending upwardly from the lower edge along the first side and a second notch extending upwardly from the lower edge along the second side, the first notch being configured to accommodate a first wheel well projecting upwardly from the cargo bed and the second notch being configured to accommodate a second wheel well projecting upwardly from the cargo bed.

14. The vehicle according to claim 13, further comprising a first door selectively covering the first notch and a second door selectively covering the second notch.

15. The vehicle according to claim 14, further comprising a first door actuator mounted to the first door and a second door actuator mounted to the second door, the first door actuator selectively shifting the first door to expose the first notch and the second door actuator selectively shifting the second door to expose the second notch.

16. The vehicle according to claim 9, wherein the cargo bed divider includes a brush arranged along the lower edge.

\* \* \* \* \*